Figures 1, 2:
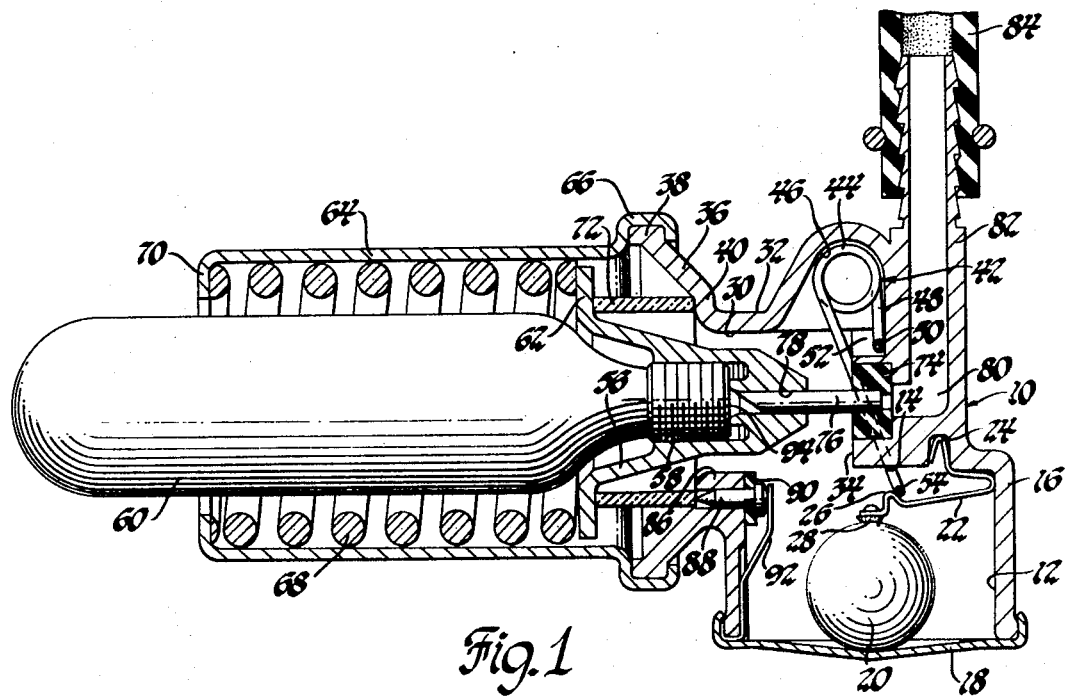

United States Patent

[11] 3,596,799

| [72] | Inventors | Clarence E. Fairchild<br>Rochester;<br>Ernst L. Ranft, Webster, both of, N.Y. |
|---|---|---|
| [21] | Appl. No. | 882,669 |
| [22] | Filed | Dec. 5, 1969 |
| [45] | Patented | Aug. 3, 1971 |
| [73] | Assignee | General Motors Corporation<br>Detroit, Mich. |

[54] FRAGMENTIZABLE GLASS MEANS FOR SENSOR AND RELEASING A PENETRATOR
4 Claims, 2 Drawing Figs.

[52] U.S. Cl. .................................................. 222/5
[51] Int. Cl. ...................................................... B67b 7/24
[50] Field of Search ............................................ 222/5;
141/19, 329, 330; 9/320, 119

[56] References Cited
UNITED STATES PATENTS
| 3,079,047 | 2/1963 | Chiodini et al. ............... | 222/5 X |
| 3,490,649 | 1/1970 | Sheridan ........................ | 222/5 |

*Primary Examiner*—Stanley H. Tollberg
*Attorneys*—W. E. Finken and Herbert Furman ABSTRACT: A sensor and trigger mechanism includes a sealed pressure vessel biased axially toward a hollow penetrator pin and normally located in spaced relationship to the penetrator pin by a hollow frangible glass cylinder having a compressively stressed continuous outer surface skin or layer. A fragmentor pin is movable normal to the end of the glass cylinder to engage the outer layer and fragmentize the glass cylinder. This permits the seal of the vessel and the penetrator pin to engage and rupture the seal so that the supply of pressure fluid within the cylinder can escape through the penetrator pin and into a manifold to inflate a restraint cushion. A ball of predetermined weight is seated at the apex of an upwardly opening conical seat. A leaf spring member includes an arm engaging the ball to hold the ball in the seat. The arm includes an integral detent portion which engages a torsionally biased arm of a torsion spring to hold the latter arm out of engagement with the fragmentor pin. The detent portion of the former engages the latter arm only when the ball is seated. Upon application of a predetermined rate of acceleration change to the ball over a predetermined time duration, the ball slides up and out of the apex of the seat and from underneath the former arm to release the latter arm to engage the fragmentor pin and drive the pin into engagement with the outer layer on the end of the cylinder to fragmentize the cylinder.

PATENTED AUG 3 1971

3,596,799

INVENTORS
Clarence E. Fairchild, &
BY Ernst L. Ranft

Herbert Furman
ATTORNEY

FRAGMENTIZABLE GLASS MEANS FOR SENSOR AND RELEASING A PENETRATOR

This invention relates generally to sensor and trigger mechanisms and more particularly to sensor and trigger mechanisms of the type including an inertia-responsive member sensing a rate of acceleration change for a predetermined period of time and actuating a trigger mechanism to fragmentize a frangible glass cylinder and permit pressure fluid within a storage vessel to be released.

The mechanism of this invention is an improvement of that disclosed and claimed in copending application Ser. No. 882,668, Ranft, St. Amand, and Zeigler, filed Dec. 5, 1969, (A-12,693).

One of the features of the mechanism of this invention is that the penetrator pin is movable generally normal to the compressively stressed layer on the end surface of the frangible glass cylinder. As pointed out in the above-noted application, the compressively stressed skin or layer is somewhat thicker at the inner and outer edges at the ends of the cylinder and therefore more force is required to fragmentize the cylinder if the fragmentor pin engages an edge of the cylinder rather than a surface. It has also been found that the fragmentor pin should move normally to whatever surface is engaged since this ensures that the pin will engage the surface with sufficient force rather than merely bounce or slide off the surface. Another feature mechanism of this invention is that a torsion spring is used to engage the fragmentor pin and drive the pin into engagement with the end surface of the glass cylinder. By using such a spring, the stored energy can be increased to in turn increase the actuation time of the trigger mechanism and result in a decreased inflation time for the restraint cushion. A further feature of this invention is that the seat for the ball is generally of upwardly opening conical shape, with the ball being normally located at the apex of the seat and held thereagainst by a resiliently biased member which exerts sufficient force on the ball to require a rate of acceleration change for a predetermined period of time before the ball moves from the apex area upwardly of the conical seat. Yet another feature of this invention is that the resiliently biased holding means includes a detent for holding a torsionally biased arm of the torsion spring out of engagement with the fragmentor pin while the ball remains at the apex of the seat. Still another feature of this invention is that the fragmentor pin is positively located with respect to the end surface of the glass cylinder to ensure that the distance between the pointed end of the pin and the surface of the cylinder remains constant to thereby ensure uniform trigger actuation time intervals in mass-produced mechanisms. In the mechanism of the afore-noted application, the fragmentor pin was not positively located but only the shank thereof was resiliently gripped. During operation of the vehicle, it is possible for the pin to move relative to the resilient gripping means so that the distance between the sharp pointed end of the pin and the edge of the cylinder could change. By positively locating the pin, as in the mechanism of this invention, the distance between the sharp pointed end of the pin and the surface of the glass cylinder is constant.

These and other features of this invention will be readily apparent from the following specification and drawings wherein:

FIG. 1 is a view partially in section of a sensor and trigger mechanism according to this invention, with the mechanism being shown in normal unactuated position; and FIG. 2 is a view similar to FIG. 1 showing the mechanism in actuated position with the pressure fluid released.

Referring now to FIG. 1 of the drawings, a housing designated generally 10 includes an annular walled chamber 12 defined by an annular base wall 14 and an annular sidewall 16 having a thickened lower edge. The opening defined by the wall 16 is closed by a ball seat member 18 crimped to the lower edge of the wall 16. Member 18 is of shallow conical cross section and a ball 20 seats at the apex thereof. A leaf spring member 22 has a return bent end portion 24 on one arm thereof self-retained within a bore in wall 14. The other free arm of the member 22 includes an integral V-shaped detent portion 26 and mounts a pad 28 on the free end thereof engageable with ball 20 diametrically opposite the apex of seat member 18 to hold the ball against the apex with a predetermined force.

In the specific embodiment shown, the ball has a ⅝-inch OD and weighs approximately 16 grams. The member 18 has a conical angle of 10°. The ball size and weight and the shape of the member 18 are, of course, variable factors depending on the conditions under which the ball 20 is intended to move away from the apex of member 18, as will be hereinafter discussed.

An annular chamber 30 is formed integrally with chamber 12 and is defined by an annular wall 32 and a counterbored, apertured end wall 34. An outwardly tapered wall 36 includes an axial flange 38 and a radial wall or flange 40 joining wall 36 to wall 32. The trigger mechanism includes a torsion spring 42 having spaced coils 44 which are seated within spaced integral recesses 46 opening to chamber 30. The remote free ends 48 of the coils have their terminal portions 50 bent inwardly toward each other and seated in respective recesses 52 in wall 34. The adjacent ends of the coils are interconnected by a generally U-shaped arm or yoke 54 which is torsionally biased clockwise to a free position clockwise of that shown in FIG. 2. When the ball 20 is in its position shown in FIG. 1, it will be noted that the detent portion 26 of member 22 engages the base of arm 54 to hold the arm immovable in its position shown. When the arm 54 is in this position, it contains a stored spring energy or force. In the specific embodiment shown, this force is 12 inch-ounces.

A frustoconical mounting member 56 includes an annular threaded bore into which the threaded end of a sealed pressure vessel or cylinder 60 is inserted. An annular flange 62 of member 56 is located in opposed spaced relationship to the annular flange 40 of the wall 36. An annular member 64 surrounds the cylinder 60 and includes a stepped flange 66 which fits over and is crimped to the flange 38 of the wall 36 to thereby secure the member 64 to the housing 10. A coil compression spring 68 seats between the flange 62 of member 56 and a lateral flange 70 of the member 64 to continually bias the cylinder 60 and the mounting member 56 to the right as viewed in FIGS. 1 and 2.

A hollow glass cylinder 72 seats between the flange 62 and the flange 40 to normally locate the cylinder 60 and the mounting member 56 against the action of the spring 68. The cylinder 72 is made of chemically treated glass which is commercially available under the name of Chem-Cor. Such glass has a compressive stress placed in its outer layer as a result of chemical treatment. In the specific embodiment shown, the cylinder has a 1-inch OD and is ½-inch in axial length. The thickness of the cylinder is 0.080 inch and the stress layer is 0.017-inch thick on the outer surface, the inner surface, and the end surfaces. The stress layer is somewhat thicker at the inner and outer edges at the ends of the cylinder.

A resilient apertured washer 74 fits within the counterbore of wall 34 and a hollow penetrator pin 76 is mounted within the aperture of the washer. The penetrator pin 76 is slidably received within an annular passage 78 of member 56, as shown in FIG. 1. The apertures of the washer 74 and wall 34 open to an annular passage or manifold 80 defined by the wall 34 and by an annular wall 82 of the housing. The manifold 80 opens to the interior of a suitable conduit 84 which is conventionally secured to the annular wall 82 and connects the manifold 80 with a conventional inflatable restraint cushion, not shown, which may be mounted at various conventional locations within a vehicle body.

Walls 32 and 40 are provided with an integral thickened apertured rib 86 which slidably receives the shank of a headed fragmentor pin 88. The head of the pin seats on a resilient washer 90 suitably secured to the rib 86 and is held thereagainst by a free arm of a leaf spring 92. Spring 92 is of light force and is hooked over the edge of wall 16 and secured in place by the crimped member 18. The apertured rib 86 locates the pin, as shown in FIG. 1, with the sharp pointed end thereof immediately adjacent and in position to engage the right-hand end of the cylinder 72. The leaf spring 92 ensures that the pin 88 is always located in the desired relationship with respect to cylinder 72 and particularly that the distance between the sharp pointed end of pin 88 and the end of cylinder 72 remains constant.

The housing 10 is mounted on a panel or wall of a vehicle body. Preferably the body panel is either a panel of the toe pan, fire wall, or floor pan so as to receive shock waves transmitted through the body structure in the event of an impact between the vehicle and another object.

The ball 20 remains seated at the apex of member 18 under the action of spring 22 during normal operation of the vehicle, despite the vehicle traveling over rough or uneven roads. The spring 22 holds the ball 20 at the apex of member 18 until the inertial load on the ball exceeds a predetermined minimum such as 10G, for a predetermined period of time such as 10 milliseconds.

Should the vehicle impact with another object with sufficient force so that a shock wave of a certain magnitude for a certain duration of time is transferred through the body to the panel on which the housing is mounted, the ball 20 slides out of the apex of member 18 and from underneath the pad 28 of spring 22 and moves up the conical wall of member 18 to either the position shown in full or in dotted lines in FIG. 2. When the ball moves to either position, or to others which are similar in that pad 28 no longer holds the ball 30 at the apex of member 18, the free arm of spring 22 swings counterclockwise to its position shown in FIG. 2. This moves the detent portion 26 of the free arm of the spring 22 out of engagement with the base of spring arm 54. Arm 54 then immediately moves from its position of FIG. 1 to its position of FIG. 2 and the base of the arm engages the free arm of spring 92 and drives the fragmentor pin 88 to the left to slightly compress washer 90 and move the sharp pointed end of the pin into engagement with the end of the glass cylinder 72. When the fragmentor pin engages the glass cylinder, the glass cylinder fragmentizes or breaks down into fragments which are generally spherical in nature, as shown in FIG. 2.

As the glass cylinder fragmentizes, the spring 68 drives the cylinder 60 and the mounting member 56 to the right from their position shown in FIG. 1 to their position shown in FIG. 2. In this latter position, the penetrator pin 76 has penetrated the rupturable or penetratable seal 94 of the cylinder 60 so that the pressure fluid, either air, nitrogen, or $CO_2$, contained within the cylinder 60 can flow through the penetrator pin and into the manifold 80 to inflate the cushion, not shown. As the member 56 moves into engagement with the washer 74, the washer is slightly compressed as it cushions and stops movement of the member 56 and the cylinder 60.

Although the embodiment of the invention shows the penetrator 6 as being fixed and the pressure vessel 60 as being movable, it is believed obvious that the vessel could remain stationery and the penetrator pin be movable.

Thus, this invention provides an improved sensor and trigger mechanism.

We claim:

1. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member and the fixed member against movement relative to each other, the glass member having an annular compressively stressed layer, a fragmentor pin movable mounted on the support for engaging the compressively stressed layer of the glass member to fragmentize the glass member and permit the biasing means to move the penetrating member and vessel member seal into penetrating engagement and release the pressure fluid, a ball seat on the support, a ball of predetermined weight seated on the seat, means holding the ball against the seat with a predetermined force sufficient to require a rate of acceleration change for a predetermined period of time to move the ball with respect to the seat, resilient means mounted on the support and including a torsionally biased movable arm for moving the fragmentor pin into engagement with the member member, and detent means on the holding means engageable with the torsionally biased arm when the ball is seated to maintain the torsionally biased arm immovable, movement of the ball with respect to the seat permitting the detent means to move out of engagement with the arm and permitting the arm to move the fragmentor pin.

2. The combination comprising, a support, a vessel member containing pressure fluid and having a penetrable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member and the fixed member against movement relative to each other, the glass member having an annular compressively stressed layer, a fragmentor pin movably mounted on the support for engaging the compressively stressed layer of the glass member to fragmentize the glass member and permit the biasing means to move the penetrating member and vessel member seal into penetrating engagement and release the pressure fluid, a conically shaped upwardly opening wall on the support apex thereof, a ball of predetermined weight seated at the apex the wall, means biased toward the apex of the wall and engageable with the ball to hold the ball against the apex of the wall with a predetermined force sufficient to require a rate of acceleration change for a predetermined period of time to move the ball upwardly of the wall and out of the apex thereof, resilient means mounted on the support and including a torsionally biased movable arm for moving the fragmentor pin into engagement with the glass member, and detent means on the holding means engageable with the torsionally biased arm when the ball is seated at the apex of the wall to maintain the torsionally biased arm immovable, movement of the ball upwardly of the wall permitting the holding means to move toward the apex of the wall and moving the detent means out of engagement with the arm to permit the arm to move the fragmentor pin.

3. The combination comprising, a support, a vessel member containing pressure fluid and having a penetratable seal, a penetrating member for penetrating the seal to release the pressure fluid, means fixedly mounting one of the members support, means movably mounting the other member on the support, means biasing the movable relative to the fixed member in a direction moving the penetrating member and vessel member seal into penetrating engagement with each other, a generally hollow annular frangible glass member seated between the support and the movable member to hold the movable member and the fixed member against movement relative to each other, the glass member having an annular compressively stressed layer, a fragmentor pin movably mounted on the support for engaging the compressively stressed layer of the glass member to fragmentize the glass member and permit the biasing means to move the penetrating member and vessel member seal into penetrating engagement and release the pressure fluid, a conically shaped ball seat on the support, a ball of predetermined weight seated on the seat arm, means biased toward the seat and engageable with the ball to hold the ball against the seat with a predetermined force sufficient to require a rate of acceleration change for a predetermined period of time to move the ball with respect to the seat, a torsion spring mounted on the support and including a torsionally biased movable arm for moving the fragmentor pin into engagement with the glass member, and detent means on the arm means engageable with the torsionally biased arm when the ball is seated to maintain the torsionally biased arm immovable, movement of the ball with respect to the seat permitting the arm means to move toward the seat and moving the detent means out of engagement with the torsionally biased arm and permit the torsionally biased arm to move the fragmentor pin.

4. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow cylindrical frangible glass member seated between the support and the movable member to hold the movable member and the fixed member against movement relative to each other, the glass member having an annular compressively stressed layer on the outer surface thereof, a fragmentor pin mounted on the support for movement normal to the outer surface of the glass member and into engagement with the compressively stressed layer to fragmentize the glass member and permit the biasing means to move the penetrating member and vessel member seal into penetrating engagement and release the pressure fluid, a ball seat on the support, a ball of predetermined weight seated on the seat, means holding the ball against the seat with a predetermined force sufficient to require a rate of acceleration change for a predetermined period of time to move the ball with respect to the seat, resilient means mounted on the support and including a torsionally biased movable arm for moving the fragmentor pin into engagement with the glass member, and detent means on the holding means engageable with the torsionally biased arm when the ball is seated to maintain the torsionally biased arm immovable, movement of the ball with respect to the seat permitting the detent means to move out of engagement with the arm and permitting the arm to move the fragmentor pin.